US011636212B2

(12) United States Patent
Mishra et al.

(10) Patent No.: US 11,636,212 B2
(45) Date of Patent: Apr. 25, 2023

(54) PREDICTING EXPLOITABILITY OF SOFTWARE VULNERABILITIES AND RECOMMENDING ALTERNATE SOFTWARE PACKAGES

(71) Applicant: International Business Machines Corporation, Armonk, NY (US)

(72) Inventors: Lawang Mishra, Bengaluru (IN); Shruthi Rs Rao, Bengaluru (IN); Payas Goyal, Bengaluru (IN); Sudhakar T. Seshagiri, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 16/743,146

(22) Filed: Jan. 15, 2020

(65) Prior Publication Data
US 2021/0216643 A1    Jul. 15, 2021

(51) Int. Cl.
*G06F 21/57*    (2013.01)

(52) U.S. Cl.
CPC .......... *G06F 21/577* (2013.01); *G06F 21/572* (2013.01); *G06F 2221/033* (2013.01)

(58) Field of Classification Search
CPC ........ G06F 21/577; G06F 21/572; G06F 8/61; G06F 2221/033; G06N 20/00; G06N 7/005
See application file for complete search history.

(56) References Cited

U.S. PATENT DOCUMENTS

| 7,284,274 | B1 | 10/2007 | Walls et al. |
| 9,094,448 | B2 | 7/2015 | Benefield |
| 9,749,349 | B1 | 8/2017 | Czarny et al. |

(Continued)

OTHER PUBLICATIONS

Younis et al., "Using Software Structure to Predict Vulnerability Exploitation Potential," SERE-C '14, Proceedings of the 2014 IEEE Eighth International Conference on Software Security and Reliability-Companion, Jun. 30-Jul. 2, 2014, pp. 13-18.

(Continued)

*Primary Examiner* — Benjamin E Lanier
(74) *Attorney, Agent, or Firm* — Yee & Associates, P.C.

(57) ABSTRACT

Identifying and evaluating exploitability of software vulnerabilities is provided. A vulnerability identified and a level of exploitability of the vulnerability corresponding to a software package is evaluated prior to installation of the software package on a data processing system based on data collected from a plurality of software vulnerability data sources. Related alternative software packages corresponding to the software package to be installed on the data processing system are identified based on a comparative analysis between alternative software packages and the software package. A confidence level is determined for each respective related alternative software package for resolving the level of exploitability. The related alternative software packages are ranked from least to most vulnerable based on a calculated exploitability score corresponding to each respective related alternative software package. Insights are generated based on determined confidence levels and rankings corresponding to calculated exploitability scores of the related alternative software packages.

20 Claims, 6 Drawing Sheets

(56) References Cited

U.S. PATENT DOCUMENTS

| | | | | |
|---|---|---|---|---|
| 2002/0112200 | A1* | 8/2002 | Hines | G06F 8/66 |
| | | | | 714/38.11 |
| 2008/0134145 | A1* | 6/2008 | Halcrow | G06F 8/65 |
| | | | | 717/124 |
| 2008/0263534 | A1* | 10/2008 | Hirsave | G06F 21/577 |
| | | | | 717/168 |
| 2014/0173737 | A1 | 6/2014 | Toback et al. | |
| 2015/0365437 | A1* | 12/2015 | Bell, Jr. | G06F 21/54 |
| | | | | 726/1 |
| 2016/0259638 | A1* | 9/2016 | El Maghraoui | G06F 8/65 |
| 2019/0163917 | A1 | 5/2019 | Bellis et al. | |
| 2020/0327237 | A1* | 10/2020 | Shakarian | G06F 17/18 |
| 2021/0089657 | A1* | 3/2021 | Dunjic | G06F 21/60 |

OTHER PUBLICATIONS

Prajapati, "A Review of the Common Vulnerability Scoring System," Medium.com, accessed Jan. 15, 2020, 7 pages. https://medium.com/critical-stack/a-review-of-the-common-vulnerability-scoring-system-2c7d266eda28.

OPSWAT, Inc., "File-Based Vulnerability Assessment—Detect Application Vulnerabilities Before They are Installed," accessed Jan. 15, 2020, 8 pages. https://www.opswat.com/technologies/vulnerability-assessment.

* cited by examiner

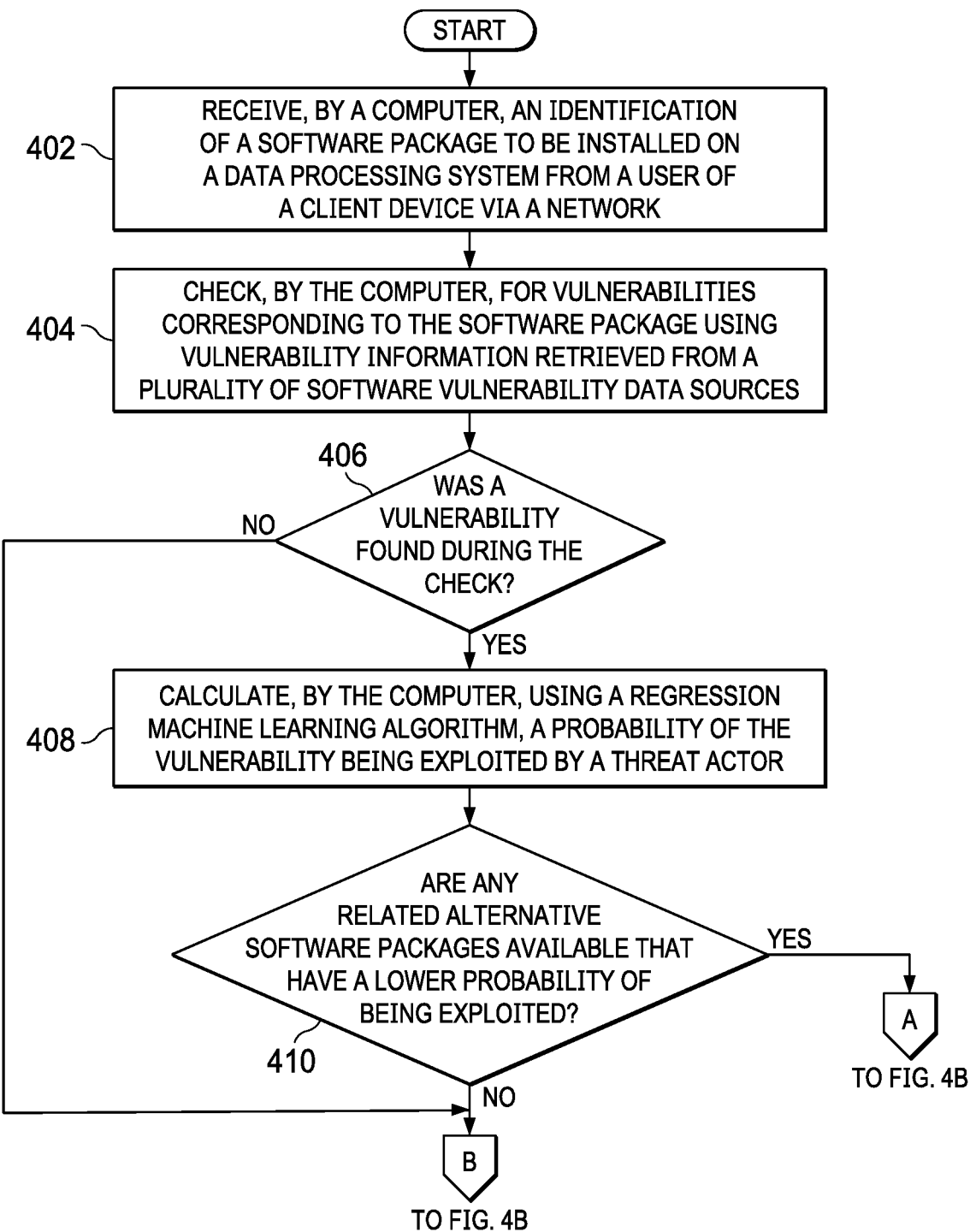

PREDICTING EXPLOITABILITY OF SOFTWARE VULNERABILITIES AND RECOMMENDING ALTERNATE SOFTWARE PACKAGES

BACKGROUND

1. Field

The disclosure relates generally to software vulnerabilities and more specifically to predicting exploitability of software vulnerabilities and recommending alternate software packages to install using machine learning and natural language generation capabilities.

2. Description of the Related Art

In computer security, a vulnerability is a weakness that can be exploited by a threat actor, such as a malicious user or hacker, to perform unauthorized actions within a computer system. In its broadest sense, the term vulnerability is associated with some violation of a security policy. In theory, all computer systems have vulnerabilities. Whether or not vulnerabilities are serious depends on whether or not the vulnerabilities are used to cause damage to the computer systems.

To exploit a vulnerability, the threat actor must have at least one tool or technique that can connect to the computer system's weakness. Vulnerability management is the practice of identifying, classifying, remediating, and mitigating vulnerabilities. This practice generally refers to software vulnerabilities in computer systems.

A vulnerability with one or more known instances of implemented attacks is classified as an exploitable vulnerability (i.e., a vulnerability for which an exploit exists). The window of exploitability is the time from when the vulnerability was introduced or manifested in deployed software, to when access to the software was removed, a security fix for the software was deployed, or the attack was disabled.

SUMMARY

According to one illustrative embodiment, a computer-implemented method for identifying and evaluating exploitability of software vulnerabilities is provided. A computer identifies a vulnerability and evaluates a level of exploitability of the vulnerability corresponding to a software package prior to installation of the software package on a data processing system based on data collected from a plurality of software vulnerability data sources. The computer identifies related alternative software packages corresponding to the software package to be installed on the data processing system based on a comparative analysis between alternative software packages and the software package. The computer determines a confidence level for each respective related alternative software package for resolving the level of exploitability. The computer ranks the related alternative software packages from least to most vulnerable based on a calculated exploitability score corresponding to each respective related alternative software package. The computer, using natural language generation, generates insights based on determined confidence levels and rankings corresponding to calculated exploitability scores of the related alternative software packages. According to other illustrative embodiments, a computer system and computer program product for identifying and evaluating exploitability of software vulnerabilities are provided.

BRIEF DESCRIPTION OF THE DRAWINGS

FIGS. 4A-4B are a flowchart illustrating a process for identifying software vulnerabilities and recommending alternative software packages in accordance with an illustrative embodiment.

DETAILED DESCRIPTION

Figure 1:
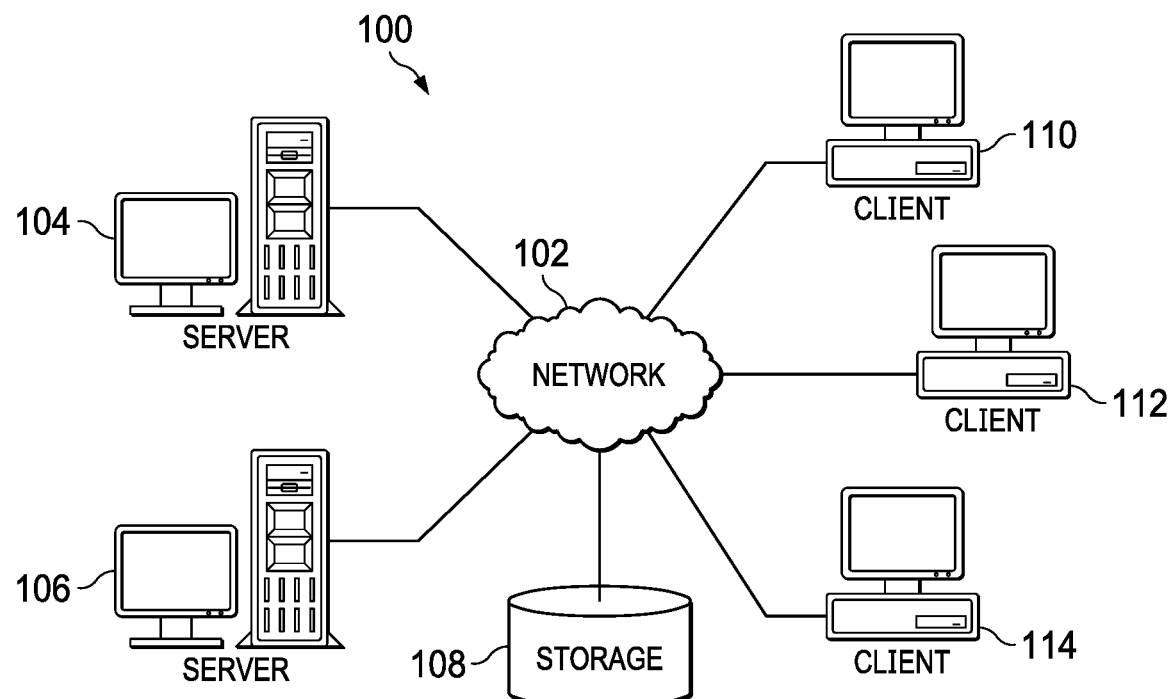
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
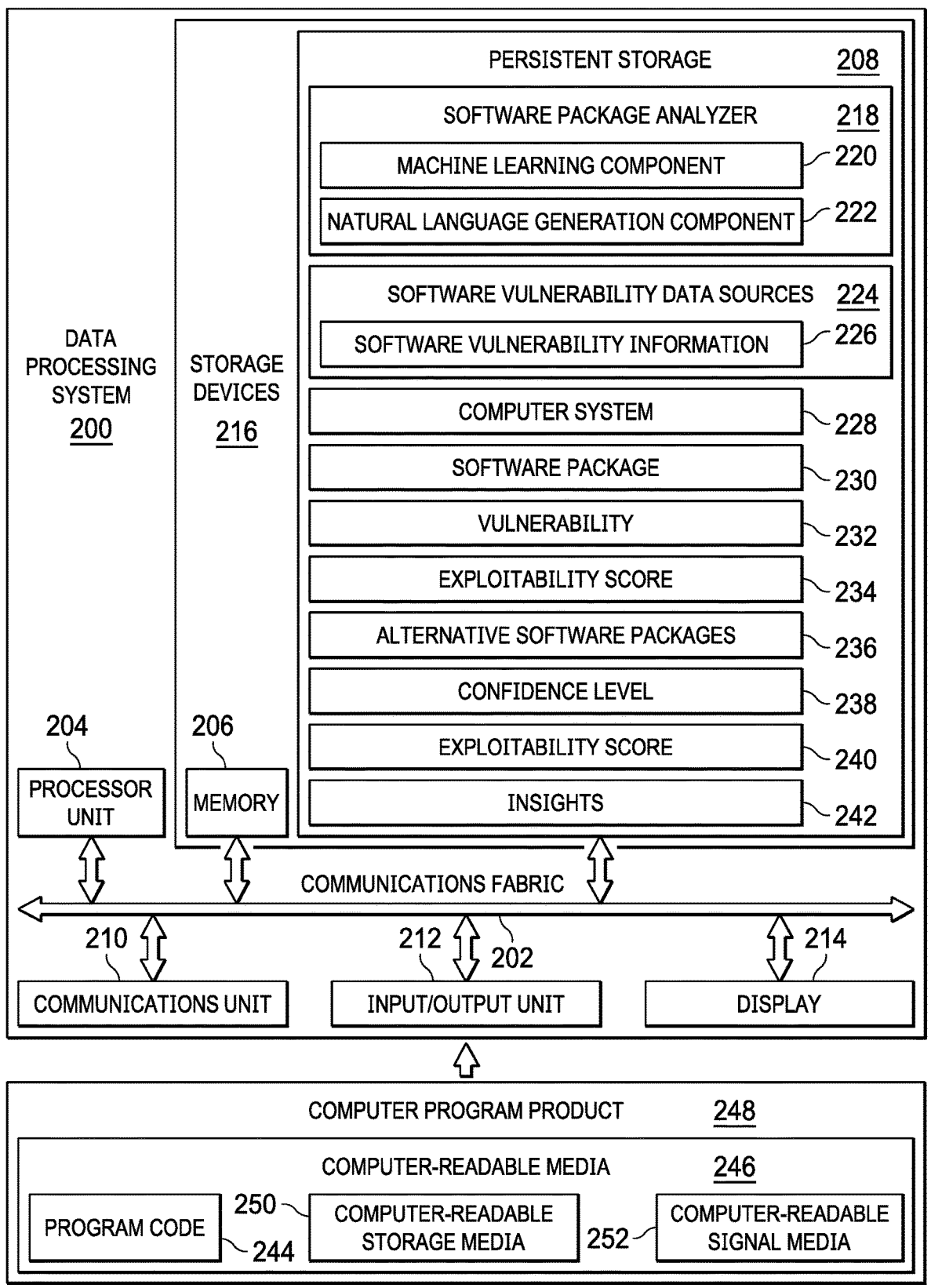
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide services for predicting exploitability of software vulnerabilities and recommending alternate software packages to install to client device users. Also, it should be noted that server 104 and server 106 may represent servers in one or more data centers. Alternatively, server 104 and server 106 may computing nodes in one or more cloud environments.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102. Users of clients 110, 112, and 114 may utilize clients 110, 112, and 114 to access and utilize the software vulnerability management services provided by server 104 and server 106.

Storage 108 is a network storage device capable of storing any type of data in a structured format or an unstructured format. In addition, storage 108 may represent a plurality of network storage devices. Further, storage 108 may store information regarding software vulnerabilities, such as, for example, common vulnerability scoring system scores, common vulnerabilities and exposures data, common weakness enumeration data, and the like. Furthermore, storage 108 may store a plurality of different software packages or modules.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores software package analyzer 218. However, it should be noted that even though software package analyzer 218 is illustrated as residing in persistent storage 208, in an alternative illustrative embodiment software package analyzer 218 may be a separate component of data processing system 200. For example, software package analyzer 218 may be a hardware component coupled to communication fabric 202 or a combination of hardware and software components. In another alternative illustrative embodiment, a first set of components of software package analyzer 218 may be located in data processing system 200 and a second set of components of software package analyzer 218 may be located in a second data processing system, such as, for example, server 106 in FIG. 1.

Software package analyzer 218 controls the process of predicting exploitability of software vulnerabilities and recommending alternate software packages to install on a computer system using machine learning and natural language generation capabilities. In this example, software package analyzer 218 includes machine learning component 220 and natural language generation component 222. Machine learning component 220 may include, for example, one or more regression algorithms. Software package analyzer 218 utilizes machine learning component 220 to, for example, analyze vulnerability descriptions, learn software vulnerability patterns, evaluate levels of exploitability of software vulnerabilities, identify whether any related alternative software packages exist for a software package having a vulnerability, calculate an exploitability score for the vulnerability of the software package and any related alternative software packages, calculate a probability of the vulnerability being exploited by a threat actor, recommend a best alternative software package, and the like. Software package analyzer 218 utilizes natural language generation component 222 to generate natural language textual insights regarding installation of the software package based on the analysis and recommendations provided by machine learning component 220. By providing the insights, natural language generation component 222 enables a user to make an informed decision as to whether to install the software package or install an alternative software package.

Software vulnerability data sources 224 represent identifiers for a plurality of different databases and websites that contain software vulnerability information 226. Software vulnerability information 226 may include, for example, identifiers and names of different software vulnerabilities, descriptions of the different software vulnerabilities, vulnerability scores corresponding to the different software vulnerabilities, exposures corresponding to the different software vulnerabilities, and the like.

Computer system 228 represents an identifier of the computer or data processing system that the user wants to install software package 230 on. Software package 230 represents an identifier of the software or module that the user wants to install on computer system 228. Software package 230 may represent any type of software or module that may be loaded on computer system 228.

In this example, software package 230 contains vulnerability 232. Vulnerability 232 may represent any type of weakness in software package 230 that a threat actor can exploit to perform unauthorized activities. Software package analyzer 218 identifies vulnerability 232 of software package 230 by retrieving from software vulnerability data sources 224 vulnerability information 226 corresponding to software package 230 and analyzing vulnerability information 226.

Software package analyzer 218 utilizes vulnerability information 226 corresponding to software package 230 to generate exploitability score 234 for vulnerability 232. Exploitability score 234 indicates a level or degree of risk of installing software package 230 on computer system 228. In other words, exploitability score 234 represents a level of exploitability of vulnerability 232 by a threat actor.

Software package analyzer 218 also identifies alternative software packages 236. Alternative software packages 236 represent identifiers for a set of one or more alternative software packages that are related to software package 230 (e.g., having same or similar bag of words models). Software package analyzer 218 calculates confidence level 238 and exploitability score 240 for each respective alternative software package within alternative software packages 236. Software package analyzer 218 calculates confidence level 238 and exploitability score 240 based on vulnerability information 226, which corresponds to each respective alternative software package, retrieved from software vulnerability data sources 224 by software package analyzer 218. Confidence level 238 indicates a degree or amount that a given alternative software package can remediate or lessen exploitability of vulnerability 232 by a threat actor. Exploitability score 240 for each respective alternative software package represents a same type of score as exploitability score 234 for software package 230 above.

Software package analyzer 218 utilizes natural language generation component 222 to generate insights 242. Insights 242 are based on analysis of software package 230, vulnerability 232, exploitability score 234, alternative software packages 236, and confidence level 238 and exploitability score 240 of each respective alternative software package by machine learning component 220. Insights 242 make it easier for the user to determine whether to install software package 230 or install one of alternative software packages 236 on computer system 228.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 244 is located in a functional form on computer readable media 246 that is selectively removable and may be loaded onto or transferred to data processing system 200 for running by processor unit 204. Program code 244 and computer readable media 246 form computer program product 248. In one example, computer readable media 246 may be computer readable storage media 250 or computer readable signal media 252. Computer readable storage media 250 may include, for example, an optical or magnetic disc that is inserted or placed into a drive or other device that is part of persistent storage 208 for transfer onto a storage device, such as a hard drive, that is part of persistent storage 208. Computer readable storage media 250 also may take the form of a persistent storage, such as a hard drive, a thumb drive, or a flash memory that is connected to data processing system 200. In some instances, computer readable storage media 250 may not be removable from data processing system 200.

Alternatively, program code 244 may be transferred to data processing system 200 using computer readable signal media 252. Computer readable signal media 252 may be, for example, a propagated data signal containing program code 244. For example, computer readable signal media 252 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 244 may be downloaded over a network to persistent storage 208 from another device or data processing system through computer readable signal media 252 for use within data processing system 200. For instance, program code stored in a computer readable storage media in a data processing system may be downloaded over a network from the data processing system to data processing system 200. The data processing system providing program code 244 may be a server computer, a client computer, or some other device capable of storing and transmitting program code 244.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 250 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the current world of software innovation, using open source software is inevitable. While open source software may offer many advantages to the software providers and developers, vulnerabilities in open source software expose applications to security risks and malicious activity. To keep up with the current trend of software innovation, software providers and developers cannot stop using open-source software. Consequently, the only available option to software providers and developers is to safeguard from vulnerabilities that have the potential to be exploited.

Solutions currently exist in marketplace today that can scan a computer system to identify vulnerabilities in open source software after the software is installed. However, these currently existing solutions identify vulnerabilities only after the software packages are installed and the computer system is scanned. During this timeframe, the computer system is prone to exploitation, which may lead to data breach, security flaws, and the system being hacked. Entities, such as, for example, enterprises, organizations, institutions, agencies, and the like, may be better served if these entities are able to identify software vulnerabilities and their potential for exploitability before installation of the software.

Illustrative embodiments check for software vulnerabilities and exploitability of these vulnerabilities using machine learning. Illustrative embodiments perform an analysis on software vulnerability information collected from various software vulnerability database sources, such as, for example, the National Vulnerability Database and the like. The National Vulnerability Database is the U.S. government repository of standards-based vulnerability management data represented using the Security Content Automation Protocol. This data enables automation of vulnerability management, security measurement, and compliance. The National Vulnerability Database includes databases of security checklist references, security-related software flaws, misconfigurations, product names, and impact metrics. In addition, illustrative embodiments provide an option for a user to include other types of software vulnerability data sources, such as, for example, social media websites, blogs, chatrooms, and the like, which post software vulnerability information.

Further, illustrative embodiments identify alternative software packages related to a software package containing a vulnerability prior to installing the software package on a computer system by performing a comparative analysis between alternative software packages and the software package to be installed on the computer system. Furthermore, illustrative embodiments determine a confidence level for each respective alternative software package for resolving exploitability of the vulnerability. Moreover, illustrative embodiments rank these alternate software packages from least vulnerable to most vulnerable based a calculated exploitability score corresponding to each respective alternative software package. In other words, illustrative embodiments predict which vulnerabilities have a higher likelihood of being exploited and provide an exploitability score on a defined scale, such as, for example, 1 to 10, for each identified vulnerability.

Illustrative embodiments also utilize natural language generation to provide insights to the user based on the analysis performed by illustrative embodiments above. Based on the insights provided by illustrative embodiments, the user is better equipped to make a decision regarding which software package to install on the computer system. Visualization of the insights gives the user an advantage in understanding the output data faster and, hence, less analysis time for the user to decide which software package to install.

If illustrative embodiments identify any vulnerability in a software package based on data analysis, then illustrative embodiments evaluate the level of exploitability of that vulnerability using a regression algorithm of machine learning. Illustrative embodiments collect the data for analysis from the various vulnerability data sources, which store information about previous exploits. Based on this collected information, illustrative embodiments generate an exploitability score for the vulnerable corresponding to the software package. The exploitability score provides the user with a better understanding of the level of risk the user is taking by installing that particular software package on the computer system.

Even though the National Vulnerabilities Database Common Vulnerability Scoring System score has an exploitability column, the National Vulnerabilities Database has issues. For example, researchers previously performed analysis of past software vulnerability data and claimed that Common Vulnerabilities and Exposures data, which had higher exploitability indicators were never exploited, and numerous threat actors, which are present outside the National Vulnerabilities Database system, are a real predictor of exploitability as compared to the Common Vulnerability Scoring System score.

Illustrative embodiments calculate an exploitability score for any given software package by first identifying any matching vulnerabilities for a given software package from the various vulnerability data sources. For each identified vulnerability corresponding to a software package, illustrative embodiments generate a bag of words model based on a description of the identified vulnerability provided in the vulnerability record. A bag of words model is a simplifying representation used in natural language processing and information retrieval. In a bag of words model, text, such as a sentence or document describing a vulnerability, is represented as a bag (i.e., dataset) of its words, disregarding grammar and even word order, but keeping multiplicity of words. The bag of words model is commonly used in methods of document classification where the occurrence or frequency of each word is used as a feature for training a classifier.

Then, illustrative embodiments generate a vector of word frequencies based on the bag of words model corresponding to the identified vulnerability. Illustrative embodiments, using machine learning, consume the vector of word frequencies to generate an exploitability score corresponding to the identified vulnerability. Illustrative embodiments repeat this process for all identified vulnerabilities for that software package. Based on the generated exploitability scores, illustrative embodiments look for alternate software packages related to the software package having vulnerabilities. It should be noted that illustrative embodiments synchronize with the vulnerability databases periodically on a predetermined time interval basis, such as, for example, every two hours, to ensure that the latest updates regarding vulnerabilities of the software package are available when illustrative embodiments are calculating the exploitability score.

Illustrative embodiments provide recommendations with vulnerability and exploitability information to the user regarding alternative software packages. Illustrative embodiments, using regression machine learning algorithms, identify whether any related alternative software packages are available for the software package, which the user is trying to install on the computer system, and rank the available related alternative software packages based on how closely they match the software package. After identifying the related alternative software packages, illustrative embodiments run the related alternate software packages through the same vulnerability and exploitability checks as the software package to determine whether any of the related alternative software packages are also exploitable. After checking all the related alternative software packages for exploitability, illustrative embodiments rank all the related alternative software packages from least vulnerable to most vulnerable.

As an example, the regression machine learning algorithm consumes the name and description of the software package as features and generates a bag of words model corresponding to the software package. Illustrative embodiments utilize the bag of words model to find related alternative software packages, which have matching or similar bag of words models. Illustrative embodiments may utilize, for example, Scikit-learn, which is a free software machine learning library for Python programming language. Scikit-learn features various algorithms, such as regression, which includes linear and logistic regression, classification, which includes k-nearest neighbors, and clustering, which includes k-means, including support vector machines, random forests, gradient boosting, and density-based spatial clustering of applications with noise, and is designed to interoperate with numerical and scientific libraries, such as NumPy and SciPy. Scikit-learn provides many unsupervised and supervised machine learning algorithms. Illustrative embodiments may also utilize a software registry, such as npm, which shares JavaScript packages or modules of reusable code.

Illustrative embodiments provide the exploitability of software package vulnerabilities analysis in natural language generation form. For example, after illustrative embodiments generate the software package recommendation, illustrative embodiments apply natural language generation on the analysis to provide the user with the best alternative software package that can be installed based on the ranking and how commonly it is used. Because illustrative embodiments regularly synchronize with the vulnerability databases, the overall analysis and recommendation are the best possible for the software package, which the user initially selected for installation on the computer system. Thus, illustrative embodiments evaluate the software package prior to installation, which is unlike the typical practice of running vulnerability checks only post installation.

Thus, illustrative embodiments provide one or more technical solutions that overcome a technical problem with only identifying software vulnerabilities post installation. As a result, these one or more technical solutions provide a technical effect and practical application in the field of software security.

Figure 3:
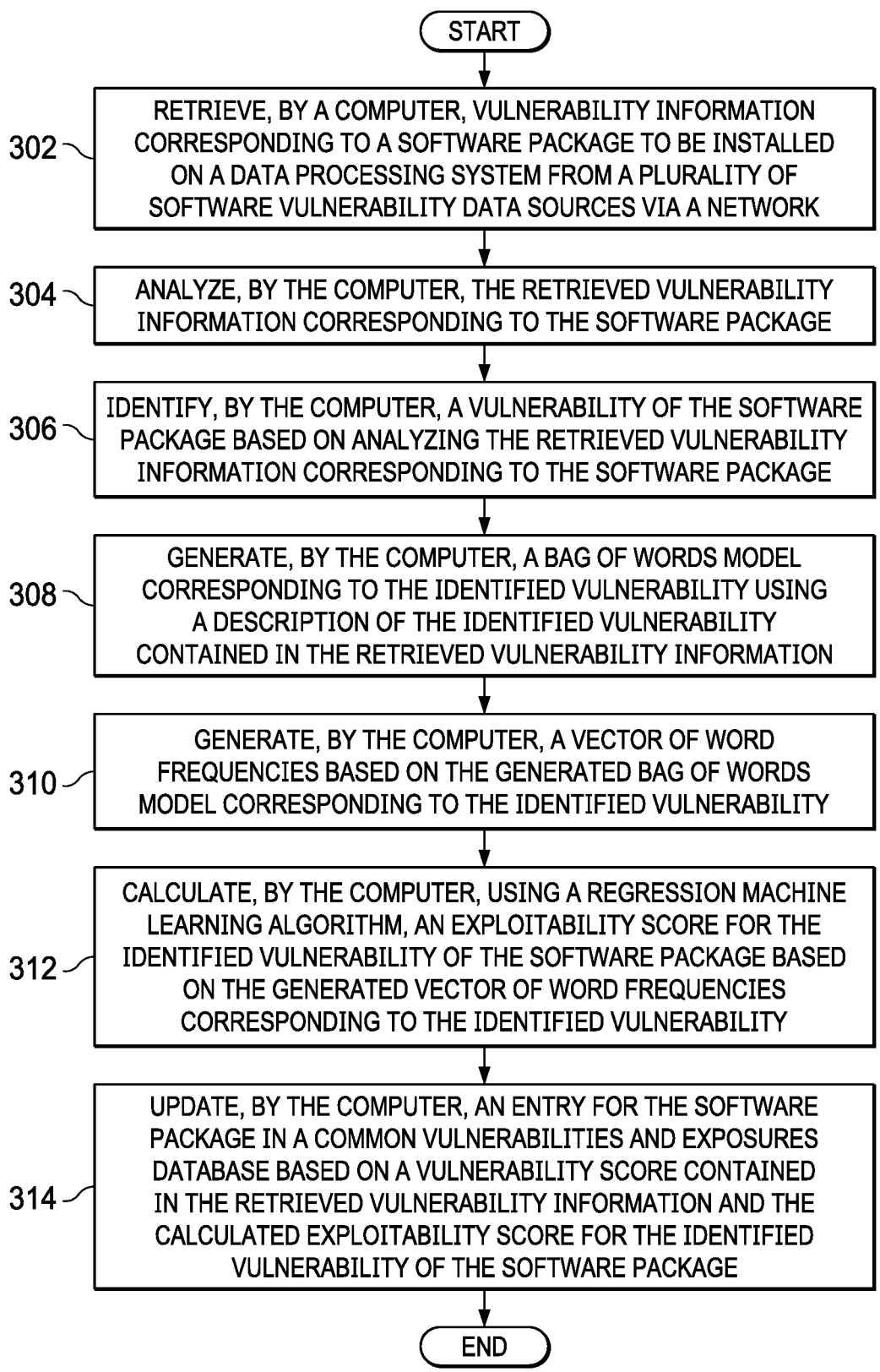
FIG. 3 is a flowchart illustrating a process for calculating software vulnerability exploitability scores for a software package in accordance with an illustrative embodiment.

With reference now to FIG. 3, a flowchart illustrating a process for calculating software vulnerability exploitability scores for a software package is shown in accordance with an illustrative embodiment. The process shown in FIG. 3 may be implemented in a computer, such as, for example, server 104 in FIG. 1 or data processing system 200 in FIG. 2.

The process begins when the computer retrieves vulnerability information corresponding to a software package to be installed (i.e., prior to installation) on a data processing system from a plurality of software vulnerability data sources via a network (step 302). The computer analyzes the retrieved vulnerability information corresponding to the software package (step 304). Afterward, the computer identifies a vulnerability of the software package based on analyzing the retrieved vulnerability information corresponding to the software package (step 306).

The computer generates a bag of words model corresponding to the identified vulnerability using a description of the identified vulnerability contained in the retrieved vulnerability information (step 308). Further, the computer generates a vector of word frequencies based on the generated bag of words model corresponding to the identified vulnerability (step 310). Furthermore, the computer, using a regression machine learning algorithm, calculates an exploitability score for the identified vulnerability of the software package based on the generated vector of word frequencies corresponding to the identified vulnerability (step 312).

The computer updates an entry for the software package in a common vulnerabilities and exposures database based on a vulnerability score contained in the retrieved vulnerability information and the calculated exploitability score for the identified vulnerability of the software package (step 314). Thereafter, the process terminates.

Figure 4B:
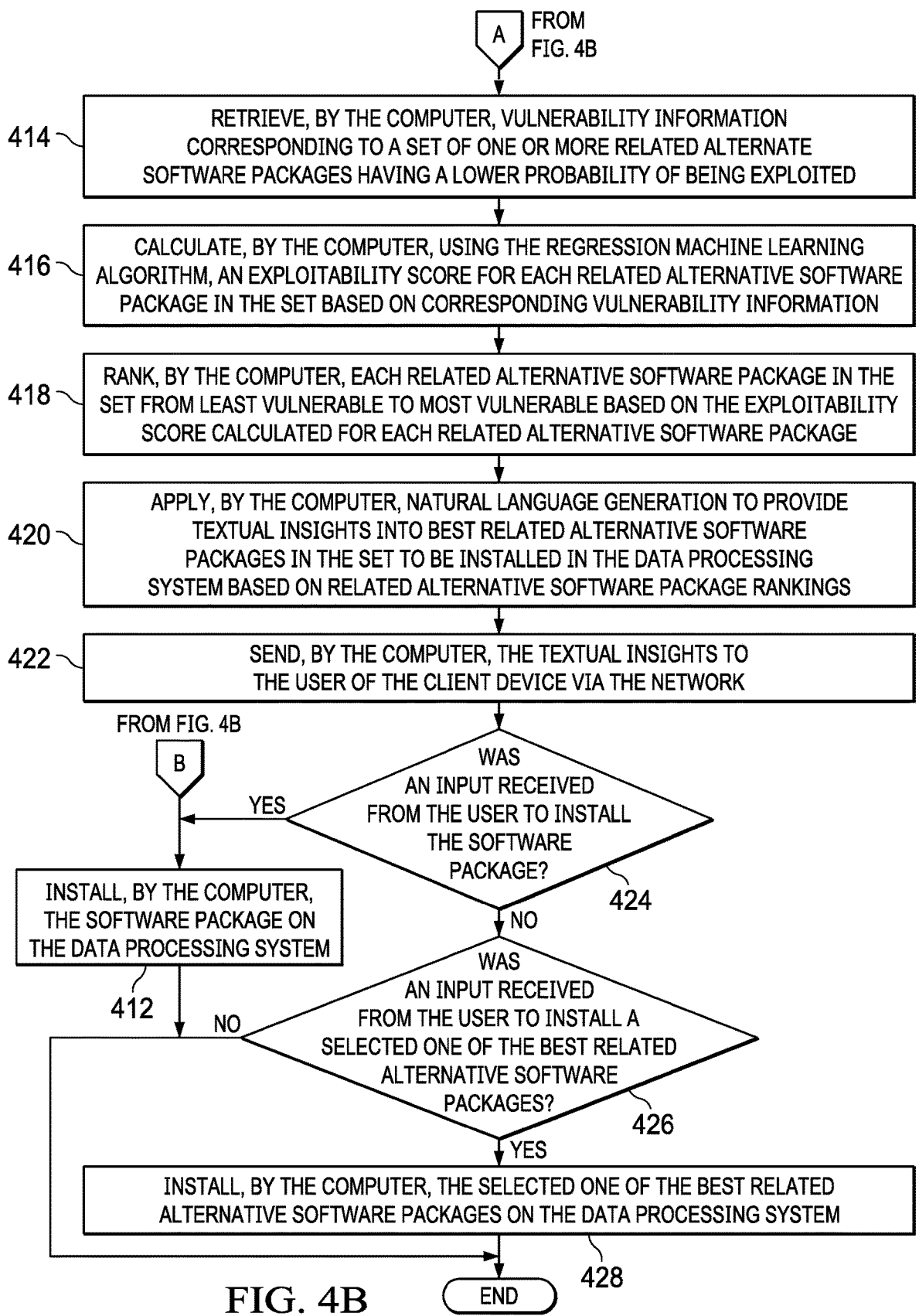

With reference now to FIGS. 4A-4B, a flowchart illustrating a process for identifying software vulnerabilities and recommending alternative software packages is shown in accordance with an illustrative embodiment. The process shown in FIGS. 4A-4B may be implemented in a computer, such as, for example, server 104 in FIG. 1 or data processing system 200 in FIG. 2.

The process begins when the computer receives an identification of a software package to be installed on a data processing system from a user of a client device via a network (step 402). The computer checks for vulnerabilities corresponding to the software package using vulnerability information retrieved from a plurality of software vulnerability data sources (step 404). Afterward, the computer makes a determination as to whether a vulnerability was found during the check for vulnerabilities corresponding to the software package (step 406).

If the computer determines that no vulnerability was found during the check for vulnerabilities corresponding to the software package, no output of step 406, then the process proceeds to step 412. If the computer determines that a vulnerability was found during the check for vulnerabilities corresponding to the software package, yes output of step 406, then the computer, using a regression machine learning algorithm, calculates a probability of the vulnerability being exploited by a threat actor (step 408). In addition, the computer makes a determination as to whether any related alternative software packages are available that have a lower probability of being exploited (step 410).

If the computer determines that no related alternative software packages are available that have a lower probability of being exploited, no output of step 410, then the computer installs the software package on the data processing system (step 412) and the process terminates thereafter. If the computer determines that related alternative software packages are available that have a lower probability of being exploited, yes output of step 410, then the computer retrieves vulnerability information corresponding to a set of one or more related alternate software packages having a lower probability of being exploited (step 414). Further, the computer, using the regression machine learning algorithm, calculates an exploitability score for each related alternative software package in the set based on corresponding vulnerability information (step 416).

Subsequently, the computer ranks each related alternative software package in the set from least vulnerable to most vulnerable based on the exploitability score calculated for each related alternative software package (step 418). The computer also applies natural language generation to provide textual insights into best related alternative software packages in the set to be installed in the data processing system based on related alternative software package rankings (step 420). The computer sends the textual insights to the user of the client device via the network (step 422).

The computer makes a determination as to whether an input was received from the user to install the software package (step 424). If the computer determines that an input was received from the user to install the software package, yes output of step 424, then the process returns to step 412 where the compute installs the software package. If the computer determines that an input was not received from the user to install the software package, no output of step 424, then the computer makes a determination as to whether an input was received from the user to install a selected one of the best related alternative software packages (step 426).

If the computer determines that an input was not received from the user to install a selected one of the best related alternative software packages, no output of step 426, then the process terminates thereafter. If the computer determines that an input was received from the user to install a selected one of the best related alternative software packages, yes output of step 426, then the computer installs the selected one of the best related alternative software packages on the data processing system (step 428). Thereafter, the process terminates.

However, it should be noted that in alternative illustrative embodiments the computer, itself, may automatically install one of the related alternative software packages. For example, the computer may autonomously select and install an alternative software package having a confidence level greater than or equal to a predefined threshold confidence level, such as, for example, 90% confidence. As another example, the computer may autonomously select and install an alternative software package having an exploitability score less than or equal to a predefined threshold exploitability score, such as, for example, 10% exploitability. As a further example, the computer may autonomously select and install an alternative software package having a confidence level greater than or equal to the predefined threshold confidence level and an exploitability score less than or equal to the predefined threshold exploitability score.

Figure 5:
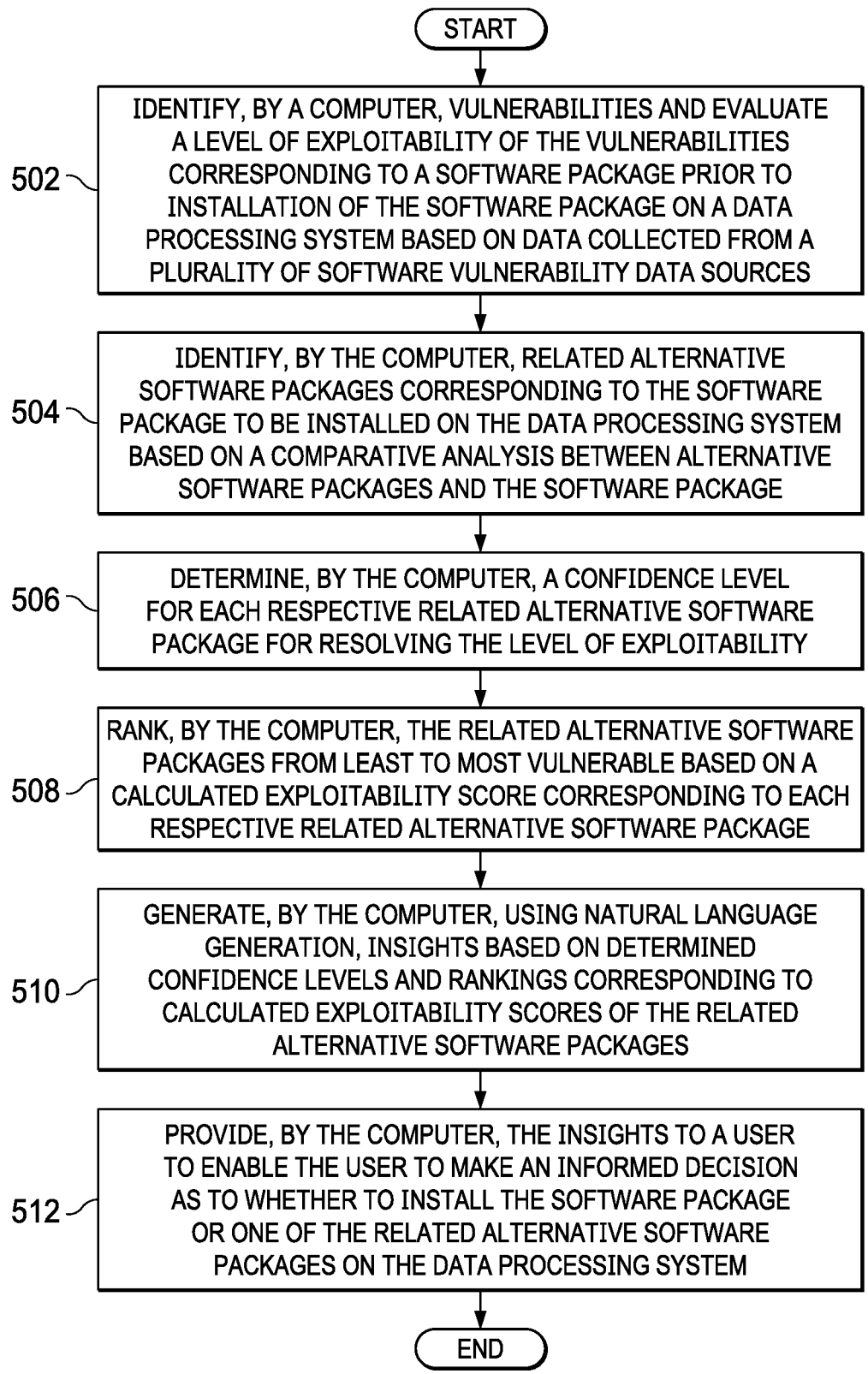
FIG. 5 is a flowchart illustrating a process for identifying a level of exploitability of vulnerabilities of a software package in accordance with an illustrative embodiment.

With reference now to FIG. 5, a flowchart illustrating a process for identifying a level of exploitability of vulnerabilities of a software package is shown in accordance with an illustrative embodiment. The process shown in FIG. 3 may be implemented in a computer, such as, for example, server 104 in FIG. 1 or data processing system 200 in FIG. 2.

The process begins when the computer identifies vulnerabilities and evaluates a level of exploitability of the vulnerabilities corresponding to a software package prior to installation of the software package on a data processing system based on data collected from a plurality of software vulnerability data sources (step 502). In addition, the computer identifies related alternative software packages corresponding to the software package to be installed on the data processing system based on a comparative analysis between alternative software packages and the software package (step 504). Further, the computer determines a confidence level for each respective related alternative software package for resolving the level of exploitability (step 506).

The computer also ranks the related alternative software packages from least to most vulnerable based on a calculated exploitability score corresponding to each respective related alternative software package (step 508). Furthermore, the computer, using natural language generation, generates insights based on determined confidence levels and rankings corresponding to calculated exploitability scores of the related alternative software packages (step 510). The computer provides the insights to a user to enable the user to make an informed decision as to whether to install the software package or one of the related alternative software packages on the data processing system (step 512). Thereafter, the process terminates.

Thus, illustrative embodiments of the present invention provide a computer-implemented method, computer system, and computer program product for predicting exploitability of software vulnerabilities and recommending alternate software packages using machine learning and natural language generation capabilities. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for identifying and evaluating exploitability of software vulnerabilities, the computer-implemented method comprising:
   identifying, by a computer, a vulnerability and evaluating a level of exploitability of the vulnerability corresponding to a software package prior to installation of the software package on a data processing system based on data collected from a plurality of software vulnerability data sources;
   identifying, by the computer, related alternative software packages corresponding to the software package to be installed on the data processing system based on a comparative analysis between alternative software packages and the software package;
   determining, by the computer, a confidence level for each respective related alternative software package for resolving the level of exploitability;
   ranking, by the computer, the related alternative software packages from least to most vulnerable based on a calculated exploitability score corresponding to each respective related alternative software package; and
   generating, by the computer, using natural language generation, insights based on determined confidence levels and rankings corresponding to calculated exploitability scores of the related alternative software packages.

2. The computer-implemented method of claim 1 further comprising:

providing, by the computer, the insights that are generated based on determined confidence levels and rankings corresponding to calculated exploitability scores of the related alternative software packages to a user to enable the user to make an informed decision as to whether to install the software package or one of the related alternative software packages on the data processing system.

3. The computer-implemented method of claim 1 further comprising:

retrieving, by the computer, vulnerability information corresponding to the software package to be installed on the data processing system from the plurality of software vulnerability data sources via a network;

analyzing, by the computer, the vulnerability information corresponding to the software package; and identifying, by the computer, the vulnerability of the software package based on analyzing the vulnerability information corresponding to the software package.

4. The computer-implemented method of claim 3 further comprising:

generating, by the computer, a bag of words model corresponding to the vulnerability using a description of the vulnerability contained in the vulnerability information;

generating, by the computer, a vector of word frequencies based on the bag of words model corresponding to the vulnerability; and calculating, by the computer, using machine learning, an exploitability score for the vulnerability of the software package based on the vector of word frequencies corresponding to the vulnerability, wherein the exploitability score indicates a level of risk of installing the software package on the data processing system.

5. The computer-implemented method of claim 4 further comprising:

updating, by the computer, an entry for the software package in a common vulnerabilities and exposures database based on a vulnerability score contained in the vulnerability information and the exploitability score for the vulnerability of the software package.

6. The computer-implemented method of claim 1 further comprising:

receiving, by the computer, an identification of the software package to be installed on the data processing system from a user of a client device via a network;

checking, by the computer, for vulnerabilities corresponding to the software package using vulnerability information retrieved from the plurality of software vulnerability data sources; and determining, by the computer, whether the vulnerability was found during the check for vulnerabilities corresponding to the software package.

7. The computer-implemented method of claim 6 further comprising:

responsive to the computer determining that the vulnerability was found during the check for vulnerabilities corresponding to the software package, calculating, by the computer, using machine learning, a probability of the vulnerability being exploited by a threat actor; and determining, by the computer, whether any related alternative software packages are available that have a lower probability of being exploited.

8. The computer-implemented method of claim 7 further comprising:

responsive to the computer determining that no related alternative software packages are available that have a lower probability of being exploited, installing, by the computer, the software package on the data processing system.

9. The computer-implemented method of claim 7 further comprising:

responsive to the computer determining that related alternative software packages are available that have a lower probability of being exploited, retrieving, by the computer, vulnerability information corresponding to a set of related alternate software packages having the lower probability of being exploited;

calculating, by the computer, using the machine learning, an exploitability score for each related alternative software package in the set based on corresponding vulnerability information; and ranking, by the computer, each related alternative software package in the set from least vulnerable to most vulnerable based on the exploitability score calculated for each related alternative software package.

10. The computer-implemented method of claim 9 further comprising:

applying, by the computer, the natural language generation to provide the insights into best related alternative software packages in the set to be installed in the data processing system based on related alternative software package rankings;

sending, by the computer, the insights to the user of the client device via the network;

determining, by the computer, whether an input was received from the user to install a selected one of the best related alternative software packages; and responsive to the computer determining that an input was received from the user to install a selected one of the best related alternative software packages, installing, by the computer, the selected one of the best related alternative software packages on the data processing system.

11. A computer system for identifying and evaluating exploitability of software vulnerabilities, the computer system comprising:

a bus system;

a storage device connected to the bus system, wherein the storage device stores program instructions; and a processor connected to the bus system, wherein the processor executes the program instructions to:

identify a vulnerability and evaluating a level of exploitability of the vulnerability corresponding to a software package prior to installation of the software package on a data processing system based on data collected from a plurality of software vulnerability data sources;

identify related alternative software packages corresponding to the software package to be installed on the data processing system based on a comparative analysis between alternative software packages and the software package;

determine a confidence level for each respective related alternative software package for resolving the level of exploitability;

rank the related alternative software packages from least to most vulnerable based on a calculated exploitability score corresponding to each respective related alternative software package; and generate, using natural language generation, insights based on determined confidence levels and rankings corresponding to calculated exploitability scores of the related alternative software packages.

12. The computer system of claim 11, wherein the processor further executes the program instructions to:
provide the insights that are generated based on determined confidence levels and rankings corresponding to calculated exploitability scores of the related alternative software packages to a user to enable the user to make an informed decision as to whether to install the software package or one of the related alternative software packages on the data processing system.

13. The computer system of claim 11, wherein the processor further executes the program instructions to:
retrieve vulnerability information corresponding to the software package to be installed on the data processing system from the plurality of software vulnerability data sources via a network;
analyze the vulnerability information corresponding to the software package; and
identify the vulnerability of the software package based on analyzing the vulnerability information corresponding to the software package.

14. The computer system of claim 13, wherein the processor further executes the program instructions to:
generate a bag of words model corresponding to the vulnerability using a description of the vulnerability contained in the vulnerability information;
generate a vector of word frequencies based on the bag of words model corresponding to the vulnerability; and
calculate, using machine learning, an exploitability score for the vulnerability of the software package based on the vector of word frequencies corresponding to the vulnerability, wherein the exploitability score indicates a level of risk of installing the software package on the data processing system.

15. The computer system of claim 14, wherein the processor further executes the program instructions to:
update an entry for the software package in a common vulnerabilities and exposures database based on a vulnerability score contained in the vulnerability information and the exploitability score for the vulnerability of the software package.

16. A computer program product for identifying and evaluating exploitability of software vulnerabilities, the computer program product comprising a computer readable storage medium having program instructions embodied therewith, the program instructions executable by a computer to cause the computer to perform a method comprising:
identifying, by the computer, a vulnerability and evaluating a level of exploitability of the vulnerability corresponding to a software package prior to installation of the software package on a data processing system based on data collected from a plurality of software vulnerability data sources;
identifying, by the computer, related alternative software packages corresponding to the software package to be installed on the data processing system based on a comparative analysis between alternative software packages and the software package;
determining, by the computer, a confidence level for each respective related alternative software package for resolving the level of exploitability;
ranking, by the computer, the related alternative software packages from least to most vulnerable based on a calculated exploitability score corresponding to each respective related alternative software package; and
generating, by the computer, using natural language generation, insights based on determined confidence levels and rankings corresponding to calculated exploitability scores of the related alternative software packages.

17. The computer program product of claim 16 further comprising:
providing, by the computer, the insights that are generated based on determined confidence levels and rankings corresponding to calculated exploitability scores of the related alternative software packages to a user to enable the user to make an informed decision as to whether to install the software package or one of the related alternative software packages on the data processing system.

18. The computer program product of claim 16 further comprising:
retrieve, by the computer, vulnerability information corresponding to the software package to be installed on the data processing system from the plurality of software vulnerability data sources via a network;
analyze, by the computer, the vulnerability information corresponding to the software package; and
identify, by the computer, the vulnerability of the software package based on analyzing the vulnerability information corresponding to the software package.

19. The computer program product of claim 18 further comprising:
generating, by the computer, a bag of words model corresponding to the vulnerability using a description of the vulnerability contained in the vulnerability information;
generating, by the computer, a vector of word frequencies based on the bag of words model corresponding to the vulnerability; and
calculating, by the computer, using machine learning, an exploitability score for the vulnerability of the software package based on the vector of word frequencies corresponding to the vulnerability, wherein the exploitability score indicates a level of risk of installing the software package on the data processing system.

20. The computer program product of claim 19 further comprising:
updating, by the computer, an entry for the software package in a common vulnerabilities and exposures database based on a vulnerability score contained in the vulnerability information and the exploitability score for the vulnerability of the software package.

* * * * *